United States Patent Office 3,031,332
Patented Apr. 24, 1962

3,031,332
METHOD OF COATING POLYETHYLENE WITH SARAN
Francis Neill Rothacker, Orange, N.J., assignor to Modern Plastic Machinery Corp., Lodi, N.J., a corporation of Delaware
No Drawing. Filed July 30, 1959, Ser. No. 830,454
9 Claims. (Cl. 117—47)

The present invention relates generally to an improved method for the treatment of film and, in particular, it relates to an improved method for reducing the gas and vapor permeability of films, webs, pellicles and the like.

Polyethylene film is widely employed as a packaging material and is highly suitable for this purpose because it is relatively inexpensive, waterproof, heat-sealable, flexible, strong, odorless and substantially inert. However, it possesses an important drawback and disadvantage in that it is highly permeable to gasses and vapors. As a consequence, it cannot be employed satisfactorily for many packaging purposes, particularly in connection with highly volatile and air-sensitive materials. Many attempts have been made to reduce the gas and vapor permeability of polyethylene film but these have heretofore proven unsuccessful. It has been attempted to apply various types of saran coatings to the polyethylene film, such coatings being typified by vinylidene chloride-acrylonitrile copolymer (Saran Resin F-120 and F-220) and vinylidene chloride-vinyl chloride copolymer, but the resulting product has been unsuitable since the adhesion or bond between the coating and the polyethylene film has been too low, resulting in a separation between the coating and the film. In the copending patent application Serial No. 786,088 of Francis Neill Rothacker, filed January 12, 1959, now abandoned, there is described a method for saran coating polyethylene and particularly a method of drying the freshly applied coating. While the resulting product is satisfactory, a reduction with time in the adhesion between the saran and polyethylene layers has been experienced, a characteristic which is highly undesirable.

It is, therefore, a principal object of the present invention to provide an improved method of producing a gas- and vapor-impermeable web.

Another object of the present invention is to provide an improved method of reducing the gas and vapor permeability of a synthetic organic thermoplastic web, pellicle, film or the like.

Still another object of the present invention is to provide a method for rendering a polyethylene type of film impermeable to gasses and vapors.

A further object of the present invention is to provide an improved method of applying a gas- and vapor-impermeable coating to a polyethylene type of film, characterized by a high degree of adhesion between the coating and film and by the maintenance of such higher degree of adhesion with time.

Still a further object of the present invention is to provide an improved method of the above nature characterized by its simplicity and ease of control.

The above and other objects of the present invention will become apparent from a reading of the following description.

It has been discovered that the permanency of a high degree of adhesion between a synthetic organic thermoplastic film, particularly one possessing plastic memory, that is, the property of slowly returning to an original unstrained state following the application of a strain imparting stress, as typified by polyethylene and similar materials, and a coating of a synthetic organic thermoplastic material, is radically increased where the film initially possesses a recoverable strain of less than a predetermined maximum and that such strain is not increased during the coating and drying of the film beyond such predetermined maximum. This maximum recoverable strain should not be more than 10% and should preferably be less than 5% of the corresponding linear dimensions of the film.

In applying the coating to the film, the film is pretreated to increase its adhesive properties. There are many methods of treating films for this purpose, but the methods, for the most part, have proven highly inadequate when employed for the production of the laminated film in accordance with the present invention. It has been found that the surface pretreating of the film should be effected in the absence of any significant or substantial concentrations of ozone and that any appreciable oxidation of the film surface should be avoided. To this end, the film is pretreated in accordance with the process described in U.S. Patent No. 2,864,755, granted December 16, 1958, to Francis Neill Rothacker. The process therein described is characterized by the use of a relatively small non-corona-producing electric fields and hence the substantial absence of ozone.

In producing a gas and liquid impermeable web employing a method embodying the present invention, a film is produced either initially in the form of lay flat tubing and then slit, or initially in the form of a single layer web, using any suitable equipment, preferably a conventional type of plastic extruder. Where the film is polyethylene, it is advantageously of low to medium density, preferably between .915 and .925, has a melt index of between 1 and 8 and preferably contains a minimum of slip additives. Examples of polyethylenes which have proven highly satisfactory are Tenn-Eastman 808 and 859, Monsanto 706, and U.S.I. 200 and 203. In extruding the film, it is important that any cold stretch imparted thereto, which is not relieved prior to the coating step, be maintained below 10% and preferably below 5%. Thus, any stretching of the film should be effected while the film is in a substantially fluid or unset plastic condition so that the resulting plastic memory or long term plastic recovery is below the critical figures set forth above. For example, a suitable polyethylene film may be produced by extruding the polyethylene in tubular form through a circular die 15 inches in diameter to form a final tube about 48 inches in circumference, so that the lateral or circumferential stretch is insignificant. Furthermore, the cooling of the freshly extruded tube is retarded so that the longitudinal drawing of the polyethylene is substantially limited to the material while it is in a semi-fluid or unset condition. Among other desirable characteristics of the resulting film insofar as the present method is concerned is that its crystallinity is many times less than the conventionally produced film.

The tube is then slit to form a single layer, a surface of which is thereafter treated in the absence of ozone or other oxidizing influence to increase its adhesive properties, preferably in the manner above set forth. The treated surface of the film is then coated with a solution of the gas impermeable synthetic organic thermoplastic resin, for example, saran dissolved in a volatile organic solvent such as acetone, methylethyl, ketone, or other suitable volatile solvent. Examples of sarans which may be advantageously employed are vinylidene chloride-acrylonitrile copolymer (Saran Resin F-120 or F-220) and vinylidene chloride-vinyl chloride copolymer. The coating may be applied in any suitable manner, such as by means of a spray, roller, knife or brush.

Following the application of the coating, the film is heated to evaporate the solvent and dry the coating, thereby completing the improved gas and liquid impermeable film. The drying of the coating is preferably effected by exposing the uncoated face of the film to infra-red radiation, as more particularly set forth in the copending application of Francis Neill Rothacker, Serial No. 786,088, filed January 12, 1959. The finished coated film is then wound into rolls or otherwise packaged and stored for further use.

A simple flow diagram of a process embodying the present invention is as follows:

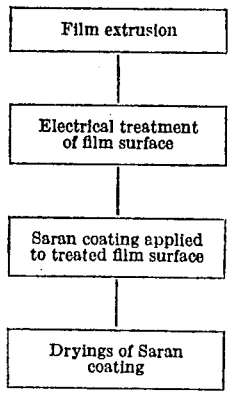

The film base and the finished film is produced, handled and stored so that the aggregate unrelieved strain, that is, in the form of a plastic memory or long term elastic recovery, does not exceed 10% and is advantageously below 5%. As aforesaid, in producing the film base, the cold drawnig or stretch is maintained at a minimum value. Furthermore, in the handling, conveying and packaging of the film, the strains should be maintained at a minimum and below the values set forth above. Thus, where the film base is Tenn-Eastman 808 polyethylene having a melt index of 7 and a density of .918, a tension on .001″ thick film of 40 pounds per square inch was well within the permissible range of stress in accordance with the present invention.

As an example of the process of the present invention, Tenn-Eastman 859 polyethylene was extruded by means of a conventional plastic extruder having a 3½ inch inner diameter barrel, through a circular die having a 15 inch diameter .020 inch wide opening. The extruded tube was maintained in an expanded condition during the cooling and setting thereof by the use of compressed air introduced into the interior thereof in the usual manner. The tube is flattened and taken up by draw rolls. The cooling of the film, the tube internal air pressure, and the extrusion and take up speeds were adjusted, so that the circumference of the final polyethylene tube was 48 inches, the film thickness was .001 inch and the drawing of the polyethylene was confined to the area where the polyethylene was in a semi-fluid unset state whereby the cold stretch of the film was well below 5%. The polyethylene tube was then slit to produce a 24 inch wide web which was then treated by the equipment and in accordance with the method of the above identified U.S. Patent No. 2,864,755, at a frequency of 800 cycles per second and at a voltage of about 2500 so that no observable corona or ozone was produced. It should be noticed that the permissible maximum voltage varies inversely as the frequency and at 400 cycles per second should be less than 3500 volts and at 2000 cycles per second should be less than 2250 volts. A 20% solution of vinylidene chloride-acrylonitrile copolymer (Dow Saran Resin F–220) in acetone was roller-applied to the treated surface of the film and the solvent evaporated and the şaran coating dried by exposing only the uncoated face of the film to infra-red radiation in the manner set forth in the above-identified patent application. The thickness of the dried saran coating was about 0.25 mil. It should be noticed that the ambient relative humidity during the processing should be less than 60% at 75° F. and preferably between 40% and 50%. The operating parameters set forth in the aforesaid copending patent application may be advantageously employed herein, as may be the varous coatings and materials disclosed therein as well as their application and the treating, coating and drying procedure, provided that the critical unrelieved strain on the film is not exceeded. In the present example, the tension on the film during the handling, conveying and treating thereof was approximately one pound.

The adhesion between the saran coating and the polyethylene film in the web produced in accordance with the above example, was tested immediately after the drying of the saran coating and it required approximately 135 grams per inch to separate the coating from the film as compared to 100 grams per inch which is considered commercially acceptable. The coating adhesion of the same film was again tested two weeks later and the reduction in the required pull was less than 10%. On the other hand, where a polyethylene film similar to that of the above example and treated and coated in the same manner, except that the film base was produced in the conventional manner and possessed an unrelieved strain in excess of 10%, a 48 inch diameter tubing having been extruded from an 8 inch diameter die in accordance with the usual practice, a radical degradation of the adhesion between the saran coating and polyethylene was experienced with time. In less than two weeks, the pull required to separate the coating from the base web fell 60%.

While a preferred embodiment of the present invention has been described, it is apparent that numerous alterations and omissions may be made without departing from the spirit thereof. For example, whereas the base web has been indicated as being formed of polyethylene, other liquid impermeable, gas permeable materials possessing plastic memory may be employed, such as polypropylene and other such polyolefins.

I claim:

1. An improved method for producing a gas- and liquid-impermeable web including the steps of subjecting to the action of a varying electric field in the substantial absence of an ozone-producing electric discharge a face of a film formed of a synthetic organic thermoplastic gas-permeable polyolefin material possessing plastic memory and having a recoverable unrelieved strain not exceeding 10% thereby to increase the adherent properties of said film face, applying a coating of saran carried in a volatile vehicle and thereafter evaporating said vehicle, the recoverable unrelieved strain of said film during said coating and evaporative steps not exceeding said 10%.

2. The method in accordance with claim 1, wherein said unrelieved stress does not exceed 5%.

3. The improved method for producing a gas- and liquid-impermeable web comprising subjecting to the action of a varying electric field in the substantial absence of an ozone-producing electric discharge a face of a polyethylene film having a recoverable unrelieved strain of less than 10%, applying a coating of an acetone solution of saran to said film face and thereafter heating said coated film to evaporate said acetone and to dry said coating, the recoverable unrelieved strain of said film during the coating and drying steps at no time exceeding 10%.

4. The improved method for producing a gas- and liquid-impermeable web comprising subjecting to the action of a high voltage varying electric field in the substantial absence of an ozone-producing electric discharge a face of a polyethylene film having a recoverable unrelieved strain of less than 5% thereby to increase the adherent properties of said film face, applying to said film face an acetone solution of saran, and thereafter heating said coated film to evaporate said acetone and to dry said coating, the recoverable unrelieved strain of said coating and drying steps at no time exceeding 5%.

5. An improved method in accordance with claim 4, wherein said polyethylene has a density of between .915 and .925.

6. An improved method in accordance with claim 4, wherein said polyethylene has a melt index of between 1 and 8.

7. An improved method in accordance with claim 4, whereby said saran is vinylidene chloride-acrylonitrile copolymer.

8. An improved method of producing a gas- and liquid-impermeable web comprising the steps of extruding a polyethylene film in the absence of any cold drawing exceeding 10% in any direction, subjecting a face of said film to a varying high voltage electric field substantially free of corona-producing discharges thereby to increase the adhesive properties of said film face, applying to said treated film face a coating of an acetone solution of saran, and thereafter heating said film and evaporating said acetone to dry said coating, said film during the extrusion treating and drying thereof having a recoverable unrelieved stress of less than 10%.

9. An improved method in accordance with claim 8, wherein said film is heated by exposing the uncoated face thereof to infra-red radiation.

References Cited in the file of this patent

UNITED STATES PATENTS

| | | |
|---|---|---|
| 2,801,447 | Wolinski | Aug. 6, 1957 |
| 2,864,755 | Rothacker | Dec. 16, 1958 |
| 2,910,723 | Traver | Nov. 3, 1959 |
| 2,930,106 | Wrotnowski | Mar. 29, 1960 |

OTHER REFERENCES

"Saran Resin F–120," November 1954, Dow Chemical Co., 20 pp., especially pp. 1 and 18.